(12) United States Patent
Bonnefoy et al.

(10) Patent No.: US 12,304,640 B2
(45) Date of Patent: May 20, 2025

(54) SUPPORT PALLET FOR AN AIRPLANE SEAT UNIT

(71) Applicant: Safran Seats, Plaisir (FR)

(72) Inventors: Bastien Bonnefoy, Issoudun (FR); Laurent Ligonniere, Issoudun (FR); José Bernardo De Morais, Chateauroux (FR); Florent Yvon, Issoudun (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 17/772,124

(22) PCT Filed: Oct. 22, 2020

(86) PCT No.: PCT/EP2020/079709
§ 371 (c)(1),
(2) Date: Apr. 26, 2022

(87) PCT Pub. No.: WO2021/083778
PCT Pub. Date: May 6, 2021

(65) Prior Publication Data
US 2022/0396359 A1     Dec. 15, 2022

(30) Foreign Application Priority Data
Oct. 31, 2019   (FR) ...................................... 1912243

(51) Int. Cl.
*B64D 11/06*   (2006.01)
(52) U.S. Cl.
CPC ...... *B64D 11/0696* (2013.01); *B64D 11/0602* (2014.12); *B64D 11/0648* (2014.12)
(58) Field of Classification Search
CPC ............ B64D 11/0696; B64D 11/0602; B64D 11/0606; B64D 11/0648; B60N 2/015; B60N 2/005
See application file for complete search history.

(56) References Cited

U.S. PATENT DOCUMENTS

| 5,868,472 A | 2/1999 | Grilliot et al. |
| 7,857,259 B2 * | 12/2010 | Baatz ........................ B64C 1/20 244/118.6 |

(Continued)

FOREIGN PATENT DOCUMENTS

| CA | 2795824 A1 * | 3/2011 | |
| WO | WO-2009129992 A1 * | 10/2009 | ......... B64D 11/0696 |
| WO | WO-2016166131 A1 * | 10/2016 | ............. B64D 11/06 |

OTHER PUBLICATIONS

International Patent Application No. PCT/EP2020/079709, International Search Report (with English translation) and Written Opinion, dated Dec. 22, 2020.

(Continued)

*Primary Examiner* — Richard Green
*Assistant Examiner* — Michael A. Fabula
(74) *Attorney, Agent, or Firm* — Kilpatrick Townsend & Stockton LLP

(57) ABSTRACT

A support pallet includes:
   a body,
   lock attachment means each created in a portion of the body, the lock attachment means each making it possible to establish an attachment between the body and a seat rail lock or with an intermediate connecting part,
   seat unit attachment means each created in a portion of the body, the seat unit attachment means each making it possible to establish a connection between the body and an element of the seat unit,
   the portions of the body comprising the lock attachment means and the portions of the body comprising the seat unit attachment means, and the rest of the body forming a single monolithic part.

14 Claims, 4 Drawing Sheets

(56) References Cited

U.S. PATENT DOCUMENTS

| | | | |
|---|---|---|---|
| 8,172,195 B2* | 5/2012 | Fanucci | B63B 29/06 248/647 |
| 8,763,972 B2* | 7/2014 | Turschel | B60N 2/01558 248/346.03 |
| 8,870,119 B2* | 10/2014 | Baatz | B64C 1/20 244/118.6 |
| 9,073,451 B1* | 7/2015 | Wurzer | F16M 11/00 |
| 10,144,516 B2* | 12/2018 | Thomaschewski | B64D 11/0696 |
| 10,618,658 B2* | 4/2020 | Thomaschewski | B64C 1/20 |
| 12,043,391 B2* | 7/2024 | Loose | B64C 1/20 |
| 2005/0072897 A1* | 4/2005 | Fanucci | B63B 29/06 248/680 |
| 2007/0080258 A1* | 4/2007 | Baatz | B64C 1/20 244/118.6 |
| 2010/0314494 A1* | 12/2010 | Gasser | B64D 11/0696 244/131 |
| 2011/0068226 A1* | 3/2011 | Baatz | B64C 1/20 244/118.6 |
| 2012/0193471 A1* | 8/2012 | Turschel | B65D 19/06 244/118.6 |
| 2015/0108273 A1* | 4/2015 | Oleson | B64C 1/18 244/120 |
| 2015/0115101 A1* | 4/2015 | Thomaschewski | B64C 1/20 244/118.6 |
| 2015/0202992 A1* | 7/2015 | Cailleteau | B60N 2/68 297/248 |
| 2017/0274999 A1 | 9/2017 | Alamgir et al. | |
| 2018/0327097 A1 | 11/2018 | Loose et al. | |
| 2019/0031355 A1* | 1/2019 | Aury | B60N 2/01558 |

OTHER PUBLICATIONS

International Patent Application No. PCT/EP2020/079709, Translated Written Opinion of the International Searching Authority, dated Apr. 30, 2022.

Advisory Circular, U.S. Department of Transportation Federal Aviation Administration, AC 25.562-1B CHG 1, Sep. 30, 2015, 108 pages.

* cited by examiner

[Fig. 1]
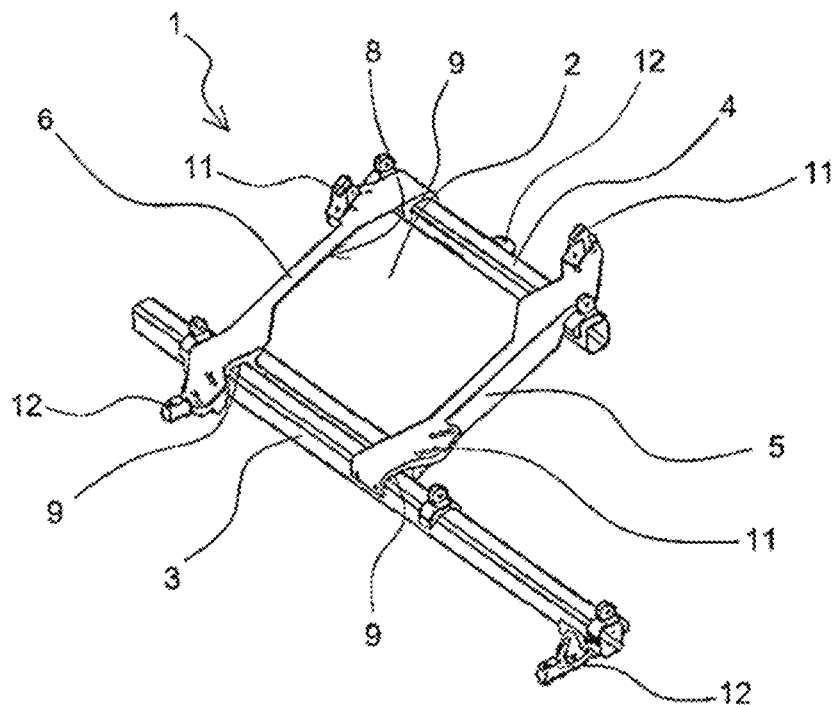
PRIOR ART
[Fig. 2]
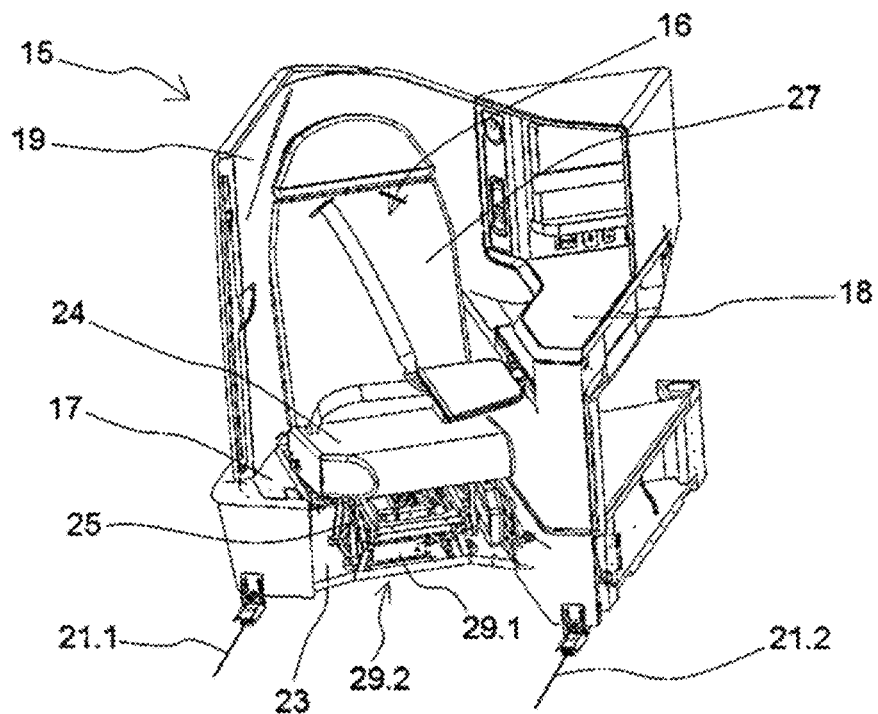

[Fig. 3]
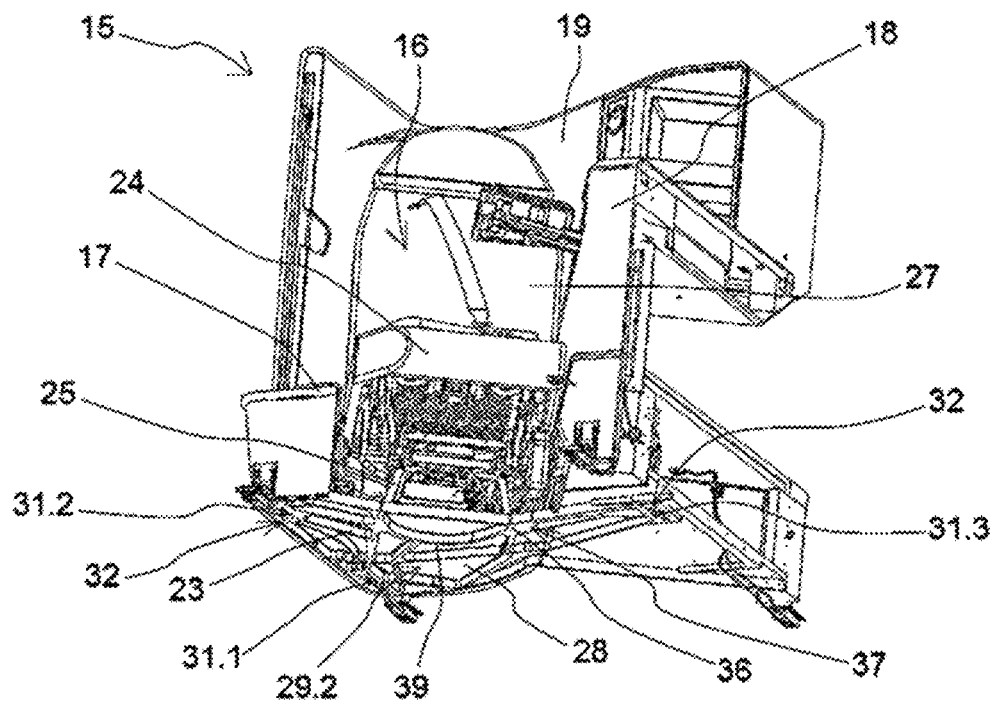
[Fig. 4]
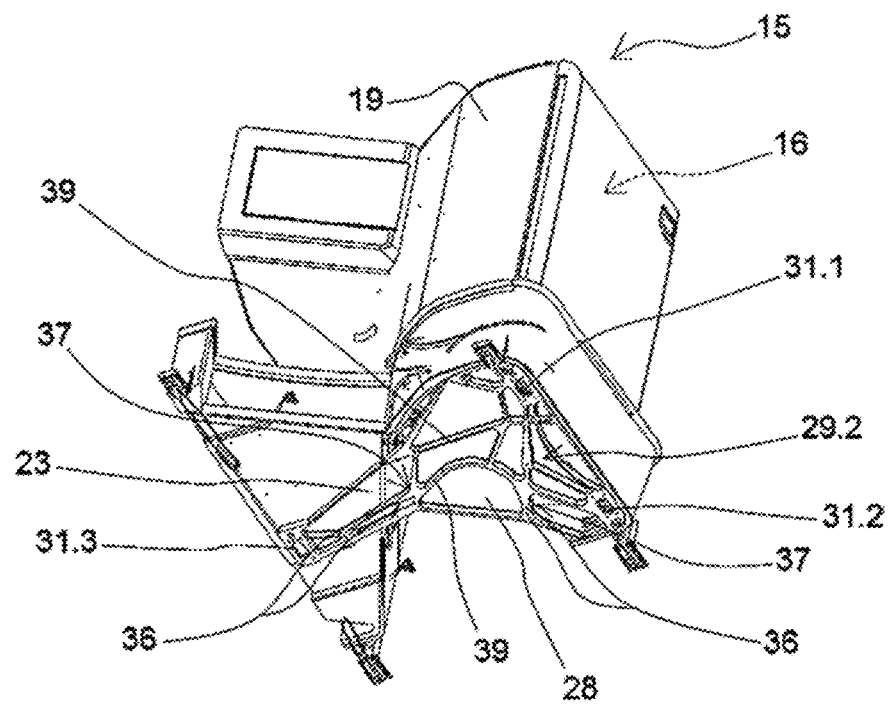

[Fig. 5]
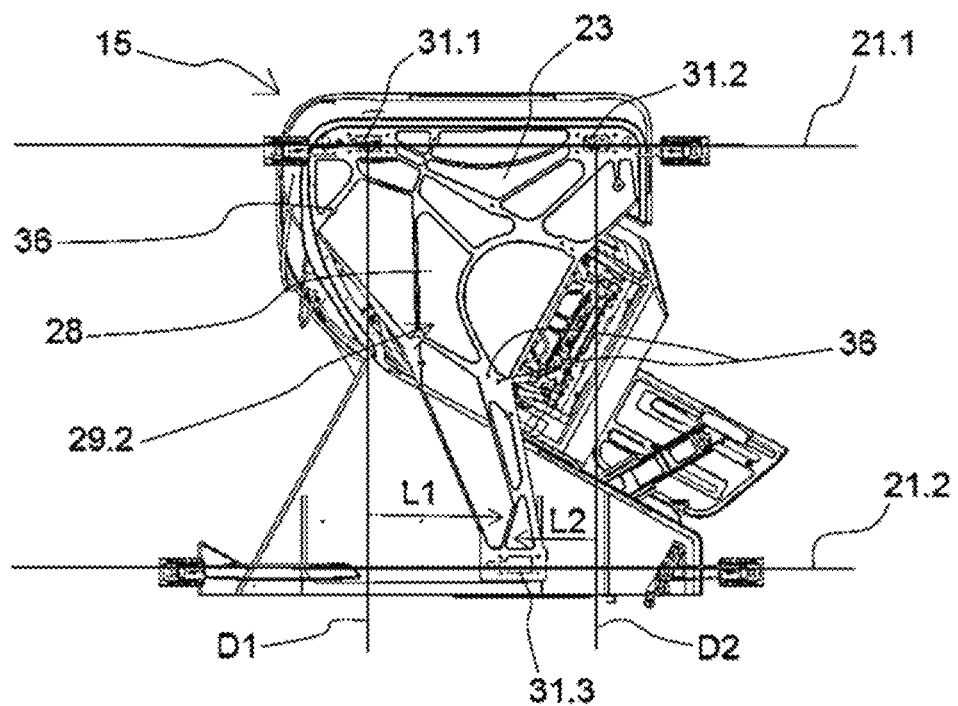
[Fig. 6a]
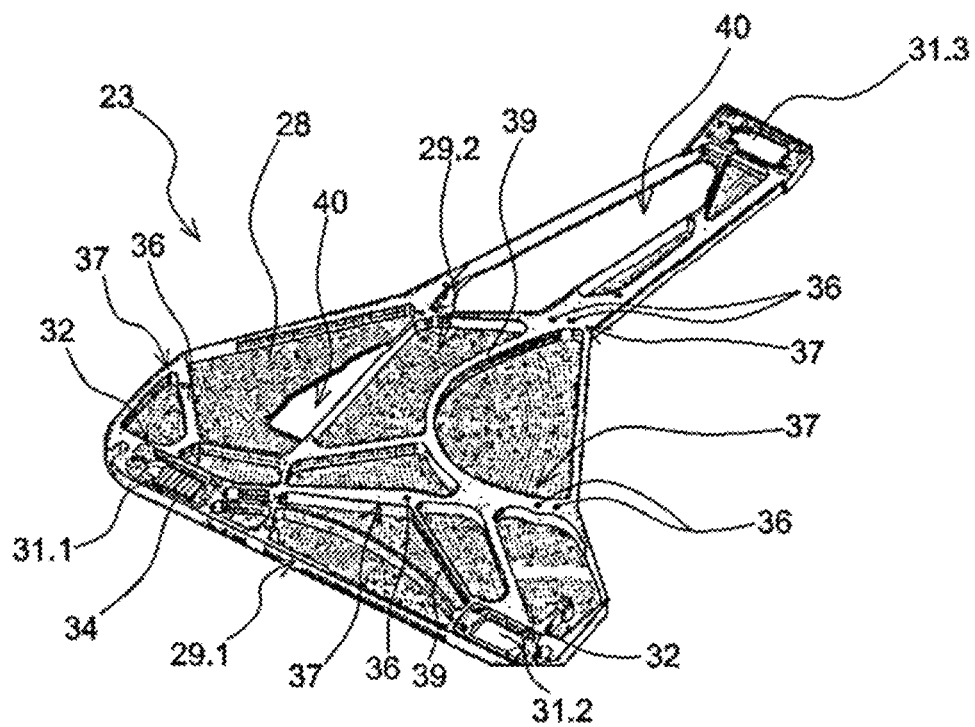

[Fig. 6b]
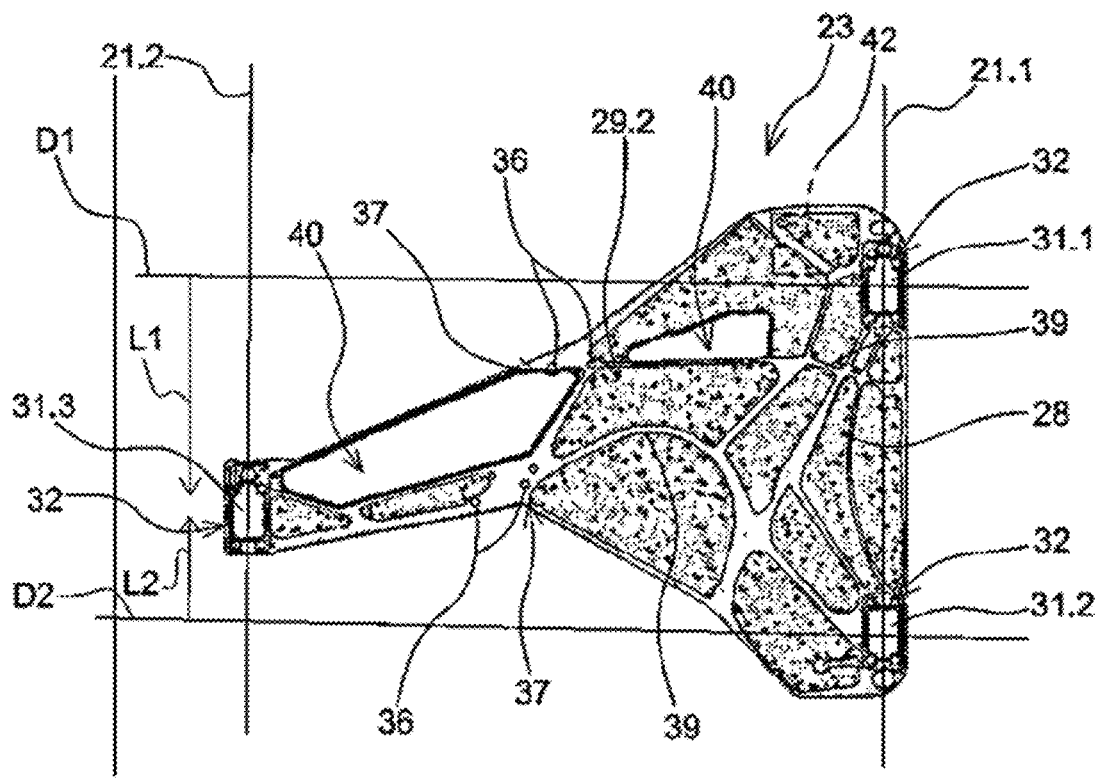
[Fig. 7]
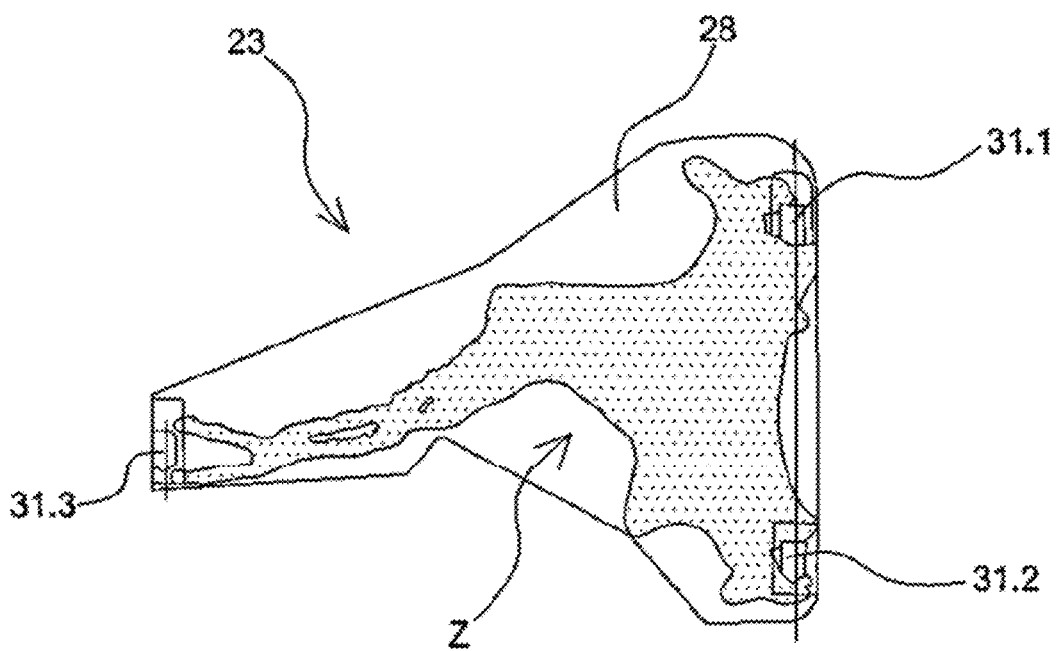

SUPPORT PALLET FOR AN AIRPLANE SEAT UNIT

CROSS-REFERENCE TO RELATED APPLICATIONS

This application is a national stage application of International Patent Application PCT/EP2020/079709, filed on Oct. 22, 2020 and titled "Support Pallet For An Airplane Seat Unit," which is related to and claims priority to France Patent Application No. 1912243, filed on Oct. 31, 2019, both of which are hereby incorporated by reference in their entireties.

The present invention relates to a support pallet for an airplane seat unit. The invention finds a particularly advantageous, but not exclusive, application with airplane seat units of the business class type. By 'seat unit' it is meant a seat as such, as well as all the elements associated with the seat, for example an armrest, a console, a privacy shell, or the like.

A support pallet for a seat unit is an interface part ensuring a mechanical connection between the rails of the airplane and at least one element of the seat unit, such as the seating surface structure.

As shown in FIG. 1, a support pallet 1 for an airplane seat unit comprises in a manner known per se a reinforcement panel 2 as well as a front cross member 3 and a rear cross member 4 either side of the reinforcement panel 2. The cross members 3 and 4 generally consist of beams.

The montage of this assembly is achieved by means of two beams 5, 6 each provided with a groove 8 receiving an edge of the reinforcing panel 2. The fixing between each beam 5, 6 and the panel 2 is made by example by riveting. In addition, a spar 5, 6 comprises at each of its ends a housing 9 for respectively receiving the front cross member 3 and the rear cross member 4. The fixing of the cross members 3, 4 to the spars 5, 6 is carried out for example by means of bolts or any other suitable fixing device.

The support pallet 1 further comprises fixing means 11 to the seat and an associated privacy shell. The pallet 1 is also equipped with fixing means with locks 12 ensuring the mechanical connection between the pallet 1 and the rails extending along the floor of the airplane cabin.

However, such a configuration has a big size, particularly in height, due to the significant thickness of the cross members 3, 4. Furthermore, the use of elements made of different materials (the panel 2 is made of a composite while the cross members 3, 4 and the spars 5, 6 are made of different metallic materials) requires to adapt the fixing interfaces to the different components, which makes the montage of the assembly complex. It should also be noted that the montage of the locks 12 is fixed due to their positioning on two cross members 3, 4 parallel to each other. Such an arrangement therefore limits the possibility of integrating components under the airplane seat.

The objective of the invention is to find an effective remedy for at least one of the aforementioned drawbacks by proposing a support pallet for an airplane seat unit comprising:

a body comprising an upper face and a lower face,
a lock fixing means each provided in a portion of the body, the lock fixing means each making it possible to ensure a fixation between the body and a seat rail lock or to an intermediate connecting piece establishing a connection between the body and a lock,
seat unit fixing means each provided in a portion of the body, the seat unit fixing means each ensuring a fixation between the body and an element of the seat unit, The portions of the body comprising the lock fixing means and the portions of the body comprising the seat unit fixing means, as well as the rest of the body forming a single piece.

The invention thus makes it possible to produce a support pallet for a seat unit that is thinner and more compact than a support pallet according to the state of the art. In addition, due to the elimination of the beams, the invention provides a great freedom of positioning of the lock fixing means, which makes it possible to free up the space under the seat. The production of the support pallet in a single piece, which is therefore produced from a single material, also facilitates the interfacing processes of the support pallet with the various components of the seat unit.

According to one embodiment, said support pallet further comprises stiffening ribs.

According to one embodiment, the stiffening ribs extend along force paths between the lock fixing means appearing during a dynamic mechanical strength test.

According to one embodiment, the stiffening ribs are arranged on the lower side of the body of the support pallet.

According to one embodiment, said support pallet comprises three lock fixing means.

According to one embodiment, said support pallet comprises a first lock fixing means and a second lock fixing means on a first side of the body and a third lock fixing means on a second side of the body.

According to one embodiment, the third lock fixing means is longitudinally offset with respect to a first straight line perpendicular to a longitudinal direction through the first lock fixing means and with respect to a second straight line perpendicular to a longitudinal direction through the second lock fixing means, so that the third lock fixing means is located longitudinally between the first lock fixing means and the second lock fixing means.

According to one embodiment, at least one through recess is made in the body.

According to one embodiment, the upper face of the body is smooth.

According to one embodiment, the upper face of the body comprises indexing zones for facilitating the positioning of an element of the seat unit with respect to the seat unit fixing means.

According to one embodiment, the single piece is made of a metallic material, in particular aluminum.

The invention also relates to an assembly comprising at least one seat unit and a support pallet for the seat unit as previously defined.

The invention further relates to an airplane comprising an assembly as previously defined.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1, already described, is a perspective view of a support pallet for a seat unit according to the state of the art;

FIG. 2 is a perspective view of a seat unit mounted on a support pallet according to the present invention;

FIG. 3 and FIG. 4 are perspective views from different angles of the seat unit and the support pallet according to the present invention;

FIG. 5 is a bottom view of the seat unit and support pallet according to the present invention;

FIG. 6a is a perspective view of the seat unit support pallet according to the present invention;

FIG. 6b is a bottom view of the seat unit support pallet according to the present invention;

FIG. 7 is a map of the mechanical stresses undergone by the support pallet for the seat unit according to the invention during a dynamic stress test.

It should be noted that, in the figures, the structural and/or functional elements common to the different embodiments can have the same references. Thus, unless otherwise stated, such elements have identical structural, dimensional and material properties.

FIGS. 2, 3, and 4 show a seat unit 15 comprising a seat 16 associated with a removable armrest 17 and a console 18 provided with a shell 19. This assembly of elements is intended to be fixed on the rails 21.1, 21.2 of an airplane by means of a support pallet for the seat unit 23. The seat 16 in particular comprises a seating surface 24 associated with a seating surface structure 25 as well as a backrest 27 movable with respect to the seating surface 24. The seat 16 is fixed on the support pallet 23 via the seating surface structure 25.

More specifically, the support pallet 23 comprises a body 28 having an upper face 29.1 and a lower face 29.2.

As can be seen in FIGS. 3 and 4, lock fixing means 31.1, 31.2, 31.3 are each provided in a portion 32 of the body 28. The lock fixing means 31.1, 31.2, 31.3 each make it possible to ensure a fixation to an intermediate connecting piece 34 shown in FIG. 6a establishing a connection between the body 28 and a lock. In this case, the lock fixing means 31.1, 31.2, 31.3 consist of openings allowing the fixation of the intermediate connecting piece 34. Alternatively, the lock fixing means 31.1, 31.2, 31.3 make it possible to ensure a direct fixation between the body 28 and a corresponding seat rail lock.

In addition, seat unit fixing means 36 are each formed in a portion 37 of the body 28. Seat unit fixing means 36 make it possible to ensure the fixation between the body 28 and an element of the seat unit 15. In this case, the seat unit fixing means 36 each consist of a threaded opening in the upper face 29.1 of the body 28. A threaded opening is intended to receive a fixing member, such as a screw, ensuring the fixation between an element of the seat unit 15 and the support pallet 23. The element of the seat unit 15 to be fixed on the body 28 could be the seat 16 as such via the seating surface structure 25, or any element placed around the seat 16, such as for example the armrest 17 and/or the console 18 and/or the shell 19. It will also be possible to fix an electronic box on the supporting pallet 23.

The portions 32 of the body 28 of the support pallet 23 comprising the lock fixing means 31.1, 31.2, 31.3 and the portions 37 of the body 28 of the support pallet 23 comprising the seat unit fixing means 36 as well as the rest of the body 28 of the support pallet 28 constitutes a single piece, as it is clearly apparent from FIGS. 6a and 6b.

In other words, there is a continuity of material between the portions 32 of the body 28 of the pallet comprising the lock fixing means 31.1, 31.2, 31.3, the portions 37 of the body 28 of the pallet comprising the seat unit fixing means 36, and the rest of the body 28 extending between these different portions 32, 37.

The single piece constituting the support pallet 23 is preferably made of a metallic material, in particular aluminum. As a variant, the part could be made of another metallic material, for example steel or magnesium. The single piece is preferably produced by machining in the mass or by 3D printing.

Advantageously, the upper face 29.1 of the body 28 is smooth, while stiffening ribs 39 are arranged on the lower face 29.2 of the body 28 of the support pallet 23.

FIG. 7 shows a distribution of the forces undergone by the support pallet 23 during a dynamic mechanical strength test. This mechanical strength test consists for example of a deformation of the floor of the airplane while the support pallet 23 is mounted on the rails 21.1, 21.2. During this so-called 'pitch and roll' type test, a constraint is transmitted to one of the rails 21.1, 21.2 so that it can pivot by a given angle, for example of the order of 10 degrees downwards, and another constraint is transmitted to the other rail 21.1, 21.2 so that it can pivot by a given angle, for example of the order of 10 degrees.

Advantageously, the stiffening ribs 39 extend along force paths between the lock fixing means 31.1, 31.2, 31.3 appearing in the zone Z during the mechanical strength test.

Advantageously, the support pallet 23 is of the 'three fixing points' type, that is to say that it comprises three lock fixing means 31.1, 31.2, 31.3.

A first lock fixing means 31.1 and a second lock fixing means 31.2 are located on a first side of the body 28. The lock fixing means 31.1 and 31.2 are aligned longitudinally with one another. By 'longitudinally aligned' it is meant that the first lock fixing means 31.1 and the second lock fixing means 31.2 are both located on the same straight line along which a rail 21.1, 21.2 extends.

By 'longitudinal direction' it is meant the direction of elongation of the rails 21.1, 21.2 of the airplane or a direction parallel to the direction of elongation of the rails 21.1, 21.2 of the airplane. The first and second fixing means 31.1, 31.2 each carry a lock for cooperating with the first rail 21.1.

A third lock fixing means 31.3 is located on a second side of the body 28 opposite the first side carrying the first and second fixing means 31.1, 31.2. The third lock fixing means 31.3 carries a lock for cooperating with the second rail 21.2.

As can be seen in FIGS. 5 and 6b. the third lock fixing means 31.3 is longitudinally offset with respect to a first straight line D1 perpendicular to a longitudinal direction through the first lock fixing means 31.1 (cf. offset L1) and with respect to a second straight line D2 perpendicular to a longitudinal direction through the second lock fixing means 31.2 (cf. offset L2), so that the third lock fixing means 31.3 is longitudinally located between the first lock fixing means 31.1 and the second lock fixing means 31.2.

The third lock fixing means 31.3 is not aligned with the first lock fixing means 31.1 and the second lock fixing means 31.2.

As can be seen on the FIGS. 6a and 6b, at least one through recess 40 is formed in the body 28 of the pallet. This recess 40 is made in a zone of the body 28 subjected to low stresses during the dynamic test. This recess 40 makes it possible to reduce the weight of the support pallet 23. If necessary, this recess 40 may allow the passage of electrical wires from an electrical harness of the airplane and intended to be connected to an electrical box near the seat. The electrical box can be fixed on the upper face 29.1 of the body 28.

According to some embodiments, the upper face 29.1 of the body 28 of the support pallet 23 comprises indexing zones 42 for facilitating the positioning of an element of the seat unit 15 with respect to the seat unit fixing means 36, as shown in FIG. 6b.

These indexing zones 42 may consist, for example, of recesses in the upper face 29.1 for guiding the element of the seat unit 15, so that the fixing holes of the element of the seat unit 15 are located opposite the threaded holes of the means 36. Alternatively, the indexing zones 42 may be constituted by guide walls from the upper face 29.1 of the body 28.

Alternatively, the support pallet 23 may include more than three fixing points, in particular four or more fixing points.

Alternatively, the fixing means 31.1, 31.2, 31.3, 36 are constituted by projecting portions of the body 28 of the support pallet 23.

Alternatively, the ribs 39 may extend only on the side of the upper face 29.1 of the body 28.

Alternatively, the ribs 39 may extend from the side of the upper face 29.1 and from the side of the lower face 29.2 of the body 28.

Of course, the different characteristics, variants and/or embodiments of the present invention can be associated with each other in various combinations insofar as they are not incompatible with or exclusive of one another.

Obviously, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. A support pallet for an airplane seat unit comprising:
   a body comprising an upper face and a lower face;
   a plurality of lock fixing means, each lock fixing means of the plurality of lock fixing means formed in a corresponding portion of the body, wherein each lock fixing means of the plurality of lock fixing means defines a fixation point such that the plurality of lock fixing means define a plurality of fixation points, wherein each fixation point is configured to engage at least one of a corresponding seat rail lock or a corresponding intermediate connecting piece to the body; and
   a plurality of seat unit fixing means, each seat unit fixing means of the plurality of seat unit fixing means provided in a corresponding portion of the body, wherein each seat unit fixing means of the plurality of seat unit fixing means defines a fixation point for attaching the body to an element of the airplane seat unit,
   wherein said support pallet further comprises a plurality of stiffening ribs, and wherein:
   the plurality of stiffening ribs extend in paths along the body between the plurality of lock fixing means such that, at least between a first lock fixing means and a second lock fixing means of the plurality of lock fixing means, at least two stiffening ribs of the plurality of stiffening ribs extend therebetween,
   the stiffening ribs integral with the body are arranged on the lower face of the body of the support pallet, and
   the upper face of the body is smooth,
   wherein the support pallet constitutes a single piece,
   wherein the body of the support pallet includes a main portion and an elongated arm, the elongated arm being defined between a lock fixing means and two seat unit fixing means, the elongated arm having a maximum width inferior to a maximum width of the main portion, and
   the elongated arm includes a through recess.

2. The support pallet according to claim 1, characterized in that the plurality of lock fixing means comprises three lock fixing means.

3. The support pallet according to claim 2, characterized in that the three lock fixing means comprises a first lock fixing means and a second lock fixing means configured to align with a first seat rail of an aircraft floor and a third lock fixing means configured to align with a second seat rail of the aircraft floor.

4. The support pallet according to claim 3, characterized in that the third lock fixing means is longitudinally offset with respect to a first straight line perpendicular to a longitudinal direction through the first lock fixing means and with respect to a second straight line perpendicular to a longitudinal direction through the second lock fixing means, so that the third lock fixing means is longitudinally located between the first lock fixing means and the second lock fixing means.

5. The support pallet according to claim 1, further comprising at least one through recess is defined in the body configured to reduce weight of the support pallet and/or allow passage of electrical wires.

6. The support pallet according to claim 1, characterized in that the single piece is made of a metallic material.

7. An assembly comprising:
   at least one seat unit; and
   a support pallet of claim 1 connected to the at least one seat unit.

8. A support pallet for an airplane seat unit comprising:
   a body comprising an upper face and a lower face;
   a plurality of lock fixing means, each lock fixing means of the plurality of lock fixing means formed in a corresponding portion of the body, wherein each lock fixing means of the plurality of lock fixing means defines a fixation point such that the plurality of lock fixing means define a plurality of fixation points, wherein each fixation point is configured to engage at least one of a corresponding seat rail lock or a corresponding intermediate connecting piece to the body; and
   a plurality of seat unit fixing means, each seat unit fixing means of the plurality of seat unit fixing means provided in a corresponding portion of the body, wherein each seat unit fixing means of the plurality of seat unit fixing means defines a fixation point for attaching the body to an element of the airplane seat unit,
   wherein said support pallet further comprises a plurality of stiffening ribs, and wherein:
   the plurality of stiffening ribs extend in paths along the body between the plurality of lock fixing means such that, at least between a first lock fixing means and a second lock fixing means of the plurality of lock fixing means, at least two stiffening ribs of the plurality of stiffening ribs extend therebetween,
   the stiffening ribs integral with the body are arranged on the lower face of the body of the support pallet, and
   the upper face of the body is smooth,
   wherein the support pallet constitutes a single piece,
   wherein the stiffening ribs are defined in a predetermined pattern which is asymmetrical in both a longitudinal and lateral direction of the body.

9. The support pallet according to claim 8, characterized in that the plurality of lock fixing means comprises three lock fixing means.

10. The support pallet according to claim 9, characterized in that the three lock fixing means comprises a first lock fixing means and a second lock fixing means configured to align with a first seat rail of an aircraft floor and a third lock fixing means configured to align with a second seat rail of the aircraft floor.

11. The support pallet according to claim 10, characterized in that the third lock fixing means is longitudinally offset with respect to a first straight line perpendicular to a longitudinal direction through the first lock fixing means and with respect to a second straight line perpendicular to a longitudinal direction through the second lock fixing means, so that the third lock fixing means is longitudinally located between the first lock fixing means and the second lock fixing means.

12. The support pallet according to claim 8, further comprising at least one through recess is defined in the body configured to reduce weight of the support pallet and/or allow passage of electrical wires.

13. The support pallet according to claim 8, characterized in that the single piece is made of a metallic material.

14. An assembly comprising:
   at least one seat unit; and
   a support pallet of claim 8 connected to the at least one seat unit.

* * * * *